United States Patent [19]

Peterson

[11] Patent Number: 5,540,540
[45] Date of Patent: Jul. 30, 1996

[54] TOWING DEVICE WITH WHEEL RESTRAINT

[76] Inventor: Edward A. Peterson, P. O. Box 415, Chelsea, Okla. 74016

[21] Appl. No.: 378,813

[22] Filed: Jan. 27, 1995

[51] Int. Cl.[6] .................................................. B60B 29/00
[52] U.S. Cl. ............................ 414/563; 280/402; 410/19; 410/30; 414/482
[58] Field of Search .................................... 414/429, 482, 414/483, 485, 563; 410/9, 19, 30; 280/402

[56] References Cited

U.S. PATENT DOCUMENTS

| | | | |
|---|---|---|---|
| 3,877,591 | 4/1975 | Howard | 414/563 |
| 4,596,506 | 6/1986 | Burgardt et al. | 410/30 |
| 4,797,057 | 1/1989 | Shoup et al. | 414/563 |
| 4,900,215 | 2/1990 | Nowell | 414/485 |
| 5,013,205 | 5/1991 | Schardt | 280/402 |

Primary Examiner—David A. Bucci
Assistant Examiner—Thomas J. Brahan
Attorney, Agent, or Firm—Gregory J. Nelson

[57] ABSTRACT

A tow dolly for a vehicle having a wheel restraint which has a hold-down rotatable to engage a surface of the wheel to restrain movement of the towed vehicle. The restraint may be retrofit onto an existing trailer or may be part of a dolly including an adjustable frame attachable to a towing vehicle. The tow dolly frame has adjustable wheel-engaging members to facilitate engagement with vehicles of different sizes and types as well as for ease of loading.

11 Claims, 2 Drawing Sheets

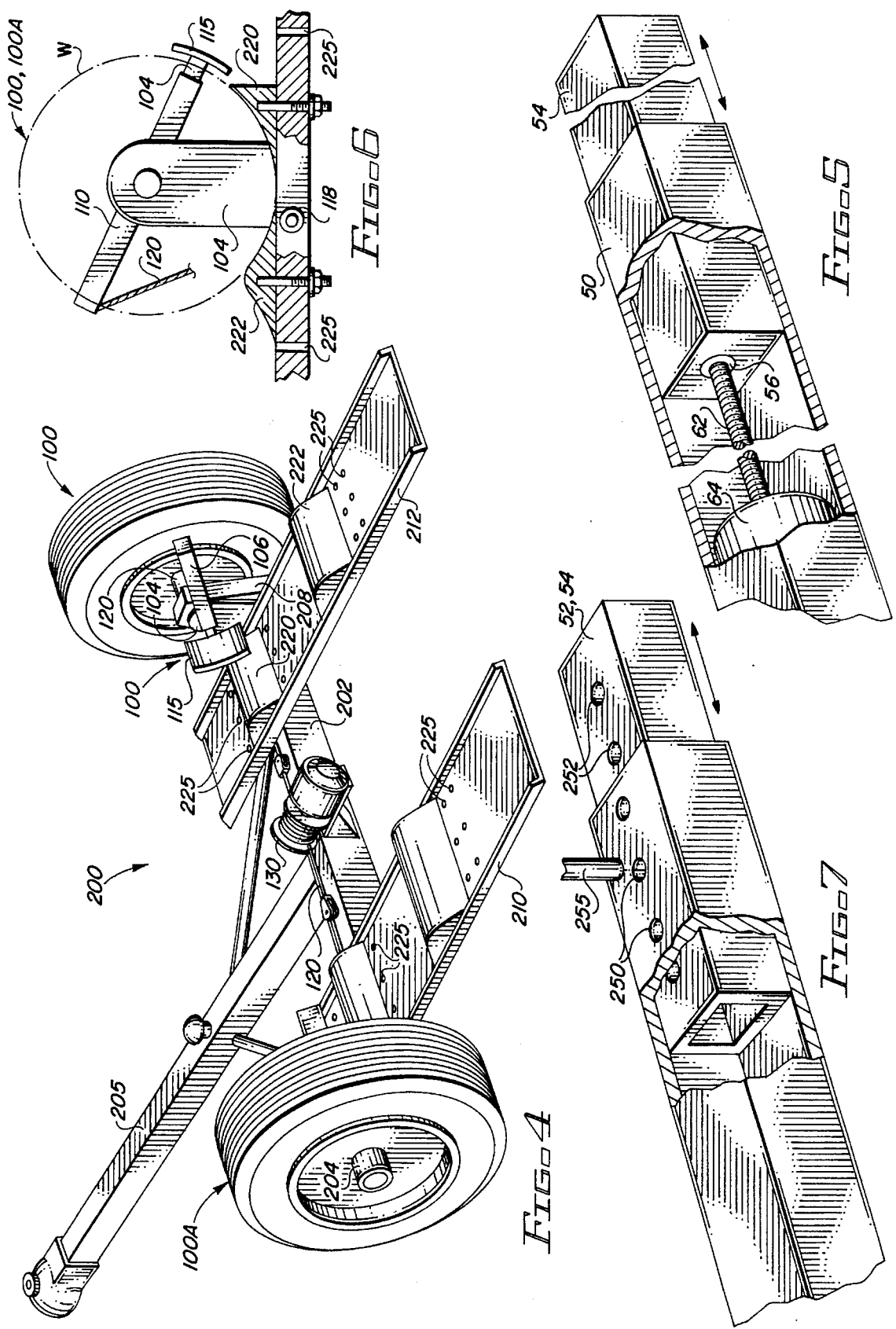

5,540,540

TOWING DEVICE WITH WHEEL RESTRAINT

FIELD OF THE INVENTION

The present invention relates generally to towing devices and more particularly relates to a towing device characterized by a wheel restraint which is fast, safe and quickly secures the towed vehicle wheels in a stable position. In one embodiment, the towing device of the present invention is a dolly assembly which may be attached to commercial towing vehicles. The device may also be used by individuals such as operators of recreational vehicles who require convenient means of transporting their personal vehicles behind a recreational vehicle or other towing vehicle. In the latter case, the wheel restraint may be retrofit to conventional towing trailers such as tilt trailers.

BACKGROUND OF THE INVENTION

Various types of towing devices can be found in the prior art. A common towing device for disabled vehicles is a commercial tow truck which has a boom which supports a sling or cradle which may be attached to the disabled vehicle. Sling-type devices are widely used but present problems in attaching the sling or cradle to the vehicle. Normally the sling or cradle arrangement places either the front or the rear of the towed vehicle in an elevated position adjacent the rear of the tow truck. This position in close proximity to the tow truck can result in the towed vehicle becoming damaged as it is towed due to the swing or twisting of the vehicle relative to the tow truck during transit which results in the vehicles colliding.

As an improvement over sling or cradle towing arrangements, some tow trucks are provided with wheel lift apparatus which apparatus attaches to the front or rear wheels of the vehicle to be towed. Such apparatus generally have a platform which support either the front or rear wheels of the vehicle to be towed depending on the drive wheel arrangement of the towed vehicle. This type of arrangement has distinct advantages over the cradle or sling arrangement reducing the possibility of damage to the towed vehicle. However, a problem with apparatus of this type are that they often require substantial manual operations be done by the driver in securing the vehicle wheels to the platform. Further, these towing apparatus do not easily adjust to or accommodate different sizes of vehicles having different size tires.

PRIOR ART

Prior art towing devices are disclosed in the following U.S. Pat. Nos. 4,434,993; 4,669,946; 4,786,223; 5,011,347; 5,294,221; and 5,330,148.

In view of the foregoing, there is a need for a compact, simple, user-friendly tow dolly for loading and transporting and unloading vehicles both for commercial and recreational purposes.

OBJECTS OF THE INVENTION

Accordingly, it is a broad object of the present invention to provide an apparatus for towing vehicles which apparatus will quickly and efficiently secure the towed vehicle to the towing device by its wheels.

It is another object of the present invention to provide a towing device which quickly and easily adjusts to the physical requirements of the vehicle to be towed.

It is another object of the present invention to provide a towing device which is relatively simple, easy to manufacture and easy and convenient in use.

It is another object of the present invention to provide a towing device which has application both to commercial towing trucks and which may be also supported on a truck or dolly for convenient transit of personal vehicles behind a recreational vehicle or similar towing vehicle.

SUMMARY OF THE INVENTION

In the preferred embodiment of the present invention, a towing device is provided which may either be connected at a hitch or other connection to a tow truck or may be supported on a mobile platform or a truck. The device comprises a dolly having a pair of transversely extending frame members. The forward frame member carries a pair of wheel-engaging chocks at its opposite ends which chocks are transversely adjustable to extend to the wheel width of the vehicle. The rear frame member extends parallel to the front member and the distance between the frame members may be adjusted. The opposite ends of the rear frame member each carry an extendable member which will engage the tire of the towed vehicle opposite the chocks. A wheel restraint device is attached to the laterally adjustable chocks on the front frame member. Each of the wheel restraint devices consist of a stand which has a bearing arrangement axially aligned with the axle of the towed vehicle. Rotatable on the stand is a sweep arm which is mechanically positioned from approximately a five o'clock position to a twelve o'clock position when actuated. Once in the twelve o'clock position, rotary motion is terminated and a hold-down pad is drawn into engagement at a pre-set pressure onto the top of the vehicle tire to secure the vehicle in a three-point position to prevent movement of the tire during transit. The wheel restraint devices are operated by a tensioning device such as a cable. The wheel restraint devices may be used in connection with the tow dolly of the invention or retrofit onto presently manufactured trailers such as tilt trailers.

Presently, loading and unloading of vehicles involves extensive positioning, placement of belting or harnesses, straps or chains and securing the vehicle with winches, or the like. In many cases, this operation must be done in inclement weather or in dangerous traffic situations. The tow device of the invention is efficient and may be rapidly put in position securing the vehicle wheels at front, peripheral and rear wheel locations. The tow device is designed to be quickly and automatically adjusted. The invention is simple, as few moving parts are involved and once adjusted, will quickly and easily accommodate a vehicle.

BRIEF DESCRIPTION OF THE DRAWINGS

Further objects and advantages of the present invention will become more apparent from the following description and drawings in which:

FIG. 4 is a perspective view of the tow dolly of the present invention shown installed on a conventional tilt trailer for attachment to a towing vehicle such as a recreational vehicle;

FIG. 5 is a detail view, partly broken away, showing the lateral adjustment mechanism for the wheel engaging members;

FIG. 6 shows the ramp and adjustable wheel chocks of a tilt trailer equipped with the wheel restraints of the invention; and FIG. 7 illustrates the optional, manual frame adjustment system.

DETAILED DESCRIPTION OF THE PREFERRED EMBODIMENT

Figure 1:
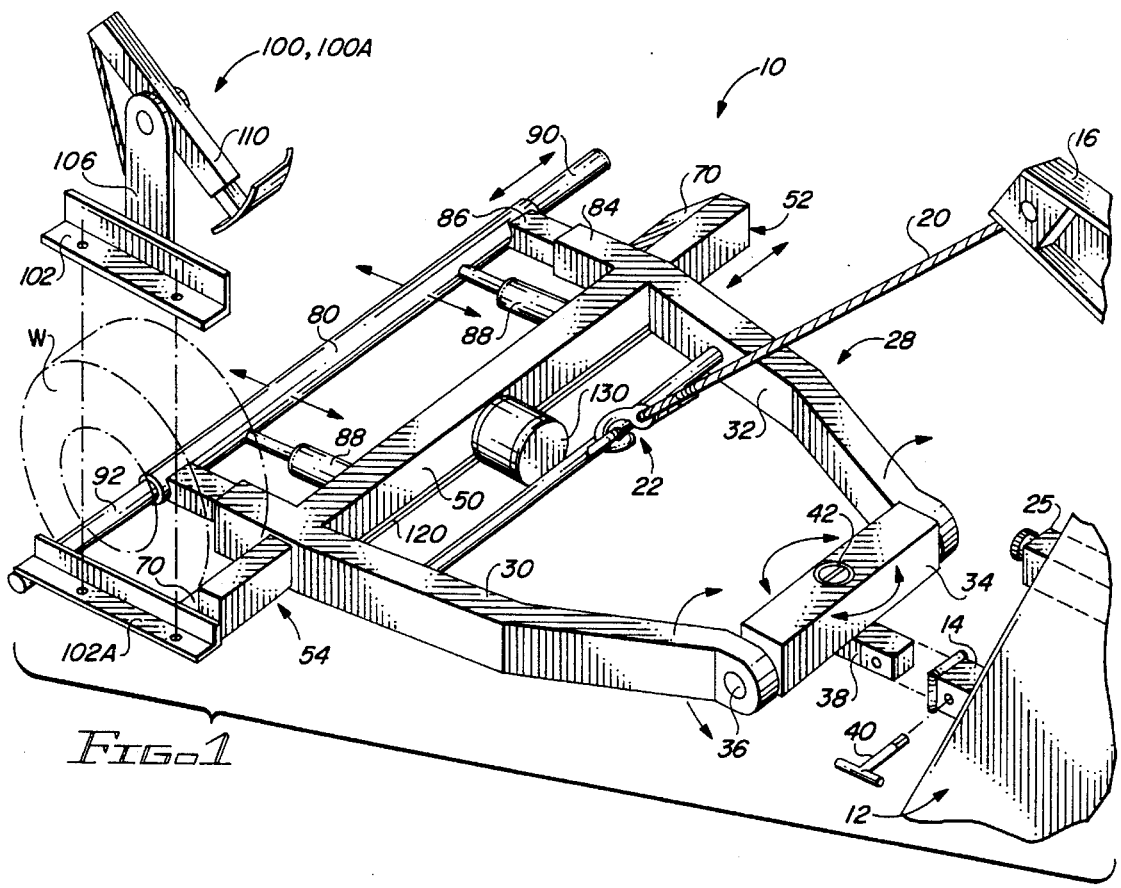
FIG. 1 is a perspective view of the tow dolly of the present invention shown in connection with a tow truck.
Figure 2:
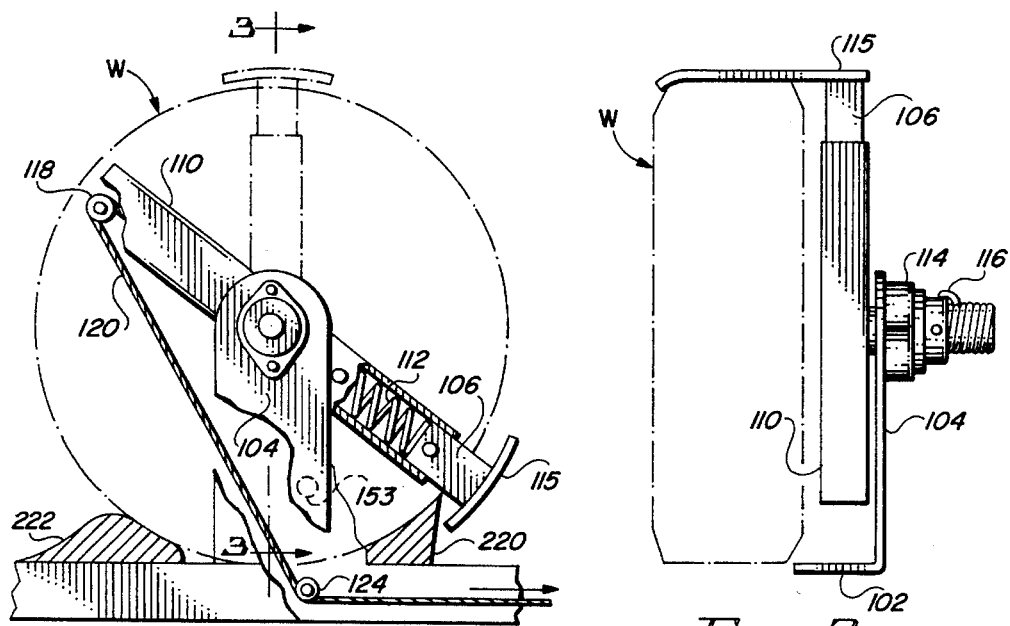
FIG. 2 is an end view partly broken away of the wheel locking device.
Figure 3:
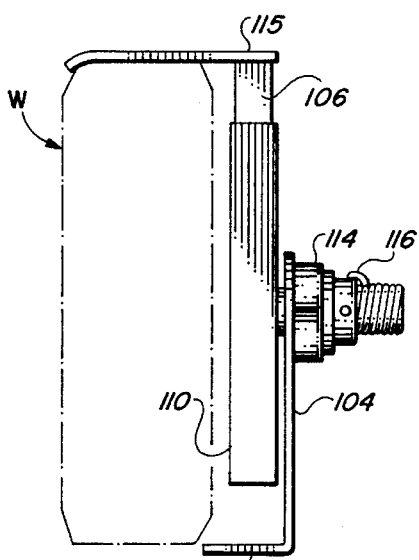
FIG. 3 is a cross-sectional view taken along line 3—3 of FIG. 2.

Referring to FIGS. 1, 2 and 3, an embodiment of the present invention is shown generally designated by the numeral 10 which is a tow dolly for use in conjunction with commercial tow vehicles. The tow vehicle is designated by the numeral 12 and has a rearwardly extending receiver 14. A boom 16 supports a cable 20 which is detachably securable to the tow dolly 10 at point 22. As is conventional, the tow truck may be provided with a rearwardly oriented video camera 25 to visually assist the driver in rearwardly maneuvering the truck and tow dolly with respect to a disabled vehicle.

The dolly 10 of the present invention is carried on a tow bar assembly 28 having a pair of forwardly extending arms 30 and 32 which converge and are pivotally attached to tow block 34. The forward ends of the arms 30, 32 are pivotal about stub shaft 36 extending from the opposite sides of the tow block. The term "forward" as used herein is for reference and refers to a direction toward the towing vehicle.

A male hitch 38 is positionable within the receiver 14 and may be secured by a locking pin 40. The hitch 38 is pivotal with respect to the tow block about vertically extending axis 42. Thus, with the hitch component 38 within the receiver, and the tow dolly secured to cable 20, the tow doily is allowed limited movement to improve the cornering and the tracking of the tow dolly as it is towed. As the boom cable is payed in and payed out, the tow dolly assembly will vertically pivot about the opposite stub shafts 36 on the tow block.

The dolly assembly further consists of a transversely extending horizontal front frame member 50 which is shown as being a square tube but may be of any suitable shape. Front wheel-engaging members 52, 54 are slidably received in the opposite ends of the tube 50 each defining an axially extending threaded bore 56 as seen in FIG. 5 which is representative of both ends of member 50. The threaded bores 56 of each of the members 52, 54 are in engagement with an extending screw jack 60, 62, respectively. The screw jacks 60, 62 are each driven by a suitable actuator 64 which may be a hydraulic, pneumatic or electric motor. Preferably the actuator and the screw jacks are contained within the member 50. Actuation of the screw jacks 60, 62 in one rotational direction will cause the members 52, 54 to extend from the tube 50. Actuation in the reverse direction of operation will cause the members 52, 54 to retract. The wheel-engaging members 52, 54 may have a curved surface 70 as seen in FIG. 1 defining a wheel chock which will engage the tread surface of a wheel as represented by "W". It is understood that the term "wheel" as used herein describes an assembly of a tire on a wheel mounted on an axle.

A rear frame member 80 is disposed rearward of member 50 and is connected to member 50 by telescopic members 84 and 86 as well as actuator 88. Actuator 88 may be electric or hydraulic and is operable to vary the spacing between members 50 and 80. Member 80 is also shown as a square tube member but may be round or other suitable shape.

Tire engaging members 90, 92 are extendable and retractable respectively at the opposite ends of tube 80 by means of screw jacks axially extending within tube 80. The screw jacks are rotatable by an actuator which may be electrical or hydraulic. As the actuator is operated in one direction, the members 90, 92 will retract within the ends of tube 80. Actuation in the opposite direction of operation will cause the arms to extend to the position as shown in FIG. 1. The operation of the members 90, 92 is accomplished in the same manner as members 52, 54 which has been described in detail previously with respect to FIG. 5. Further detailed discussion is not believed to be necessary.

With the foregoing construction, the longitudinal spacing between wheel-engaging members 54 and 92 and wheel-engaging members 52 and 90, respectively, can be adjusted by the operator in conformance with the physical size of the vehicle wheel. Similarly, the position of the wheel-engaging members 52, 54 and 90, 92 can be laterally adjusted to conform to the wheel width of the vehicle to be towed.

In addition to the foregoing, the tow dolly includes a pair of wheel restraint assemblies secured to the outer end of wheel-engaging members 50, 52 so their position is adjusted as members 50, 52 are adjusted. The wheel restraint assemblies are generally designated by the numerals 100 and 100A and are best represented in FIGS. 2 and 3. The wheel restraint assemblies each include a horizontal base member 102. Assembly 100 is secured to the outer end of extendable member 52 and assembly 100A is secured to member 54. Each has a vertically extending support member 104 which houses a bearing 114 generally axially aligned with the axis of the vehicle wheels. A tube-like arm 110 is rotatably secured to the support 104 at the bearing. One end of arm 110 slidably receives end member 106 which is outwardly biased by compression spring 112. The outer end of the end member 106 carries a hold-down 115 which may be slightly arcuate as seen in FIG. 3 and extends inwardly over the area of the vehicle tire. The inner surface of the hold-down 115 may be coated with a suitable frictional material. A torsion spring 116 at the axis will normally bias the arm 110 in the position shown in FIG. 2. The end member 106 is connected to a cable 120 which extends within or along the arm 110 and over cable draw-down 118. Cable 120 also extends across cable draw-down and tensioning pulleys 124 and along tube 50 to be commonly connected to cable reel 130. In the normal unactuated position, arm 110 and wheel hold-down 115 are in the position shown in FIGS. 2 and 3. When cable 120 is tensioned by means of rotation of cable drum 130, the arm 110 will rotate to approximately a vertical or twelve o'clock position shown in dotted lines in FIG. 2 at which point the arm will engage stop 135. Once in this position, rotation of the arm is impeded and further tension applied to the cable 120 will cause the tube 106 to retract against the spring, bringing the hold-down 115 into engagement with the tread surface of the wheel "W".

The tow dolly of the present invention will be better understood from the following description of use.

The tow dolly 10 is connected to the tow truck 12 at the receiver 14 as shown and locked by lock pin 40. The cable 20 of the truck boom assembly is attached to connection point 22 on the tow bar assembly and suspended at an appropriate elevation as for example approximately 16" above the pavement surface.

When the tow operator arrives at the location of the disabled vehicle, the tow truck driver will orient the tow dolly with respect to the vehicle to be towed. For example, if the disabled vehicle is a front-wheel drive vehicle, the front wheels will be placed on the tow dolly. Accordingly, the tow truck will be backed to a position in which the dolly is in alignment with the front wheels of the vehicle. The camera 25 will assist the driver in proper maneuvering of the tow truck. The tow truck operator will operate actuator 64 to first extend the wheel-engaging members 52, 54 to a position aligned with the tires. Actuator 88 will be extended to full extension and the wheel-engaging members 90, 92 will be fully retracted. The full extension position of actuator 88 will position frame members 50 and 80 sufficiently apart to accommodate larger wheel diameters. With the wheel-engaging members 90, 92 in the retracted position, the dolly can now be lowered onto the pavement by cable 20 and by means of the tow truck, moved rearwardly until the tires are firmly abutting members 52 and 54. The members 90, 92 are now extended. Thereafter actuator 88 is retracted to bring the members 90, 92 into firm engagement at the lower rear portion of the tires with the members 52, 54 engaging the front of the tire.

Thereafter, cable reel 130 is powered on to tension cable 120 to rotate the arms 110 of both wheel restraint assemblies 100, 100A to the approximate twelve o'clock position. Continued operation will cause the tire-engaging hold-down 115 of the wheel restraint assemblies 100, 100A to engage the peripheral surface of the wheels exerting a predetermined radial hold-down force. Preferably, a control system in the cab will indicate to the driver when the hold-downs 115 have engaged the tires. At this point, the tow truck operator can raise the dolly by means of cable 20 until the dolly is off the ground a suitable distance such as approximately 16". The vehicle is then in a tow position and is securely restrained. The tow arrangement allows the tow dolly both limited pivotal movement in the horizontal and vertical directions to provide for smoother towing and tracking. It is important to note that the loading operation is a totally hands-off automated loading system.

FIG. 4 shows an alternate embodiment of the present invention which is generally designated by the numeral 200. In this embodiment, the invention is adapted for use in connection with a conventional towing trailer of the type often used by RV owners. In this embodiment, the towing trailer 202 has a wheel and axle assembly 204 which is connectable to a towing vehicle such as an RV by a tongue 205. The wheel and axle assembly supports a frame 208 which is tiltable about the axle to accommodate loading of vehicle wheels on the frame. Ramps 210 and 212 form a portion of the tilt frame and with the frame tilted, the ramps will engage the roadway so the vehicle can be driven or wheeled onto the ramp. As the vehicle moves forwardly, the tilt frame will return to the transport position. The tilt frame may be manually locked in this position or in some cases trailers of this type are provided with positive locking mechanisms without requiring a separate pin or other locking mechanism. The configuration of the tilt trailer forms no particular part of the invention and is set forth only to facilitate an understanding of the present invention. Representative tilt trailers are those manufactured by Demco, Dethmers Mfg. Company of Boyden, Iowa. In FIG. 1 an embodiment of the invention which may be attached to a tow truck has been shown. The present invention as shown in the embodiment of FIG. 4 may also be applied to conventional trailers such as tilt trailers described above.

When the present invention is applied to conventional trailers, a pair of front wheel chocks 220 will be secured to the forward end of the ramps 210 and 212. The wheel chocks may be fixed in position but preferably are adjustable fore and aft and laterally to conform to the size of the tire of the vehicle to be towed. Generally an RV or owner of a similar towing vehicle would set up the towing device for a particular vehicle, the vehicle which would normally be towed. Similarly, a rear chock 222 is provided which also is adjustable both in the fore, aft and lateral directions. Adjustability can be accomplished by providing a plurality of holes 225 in the ramp deck. The chocks can then be properly positioned with the chocks having a depending threaded stud which is inserted in the appropriate hole and secured in place by a nut 230. Alternately, the chocks may be engaged in slots provided in the ramps for this purpose. The driver then drives or wheels the vehicle to be towed onto the ramp with the wheel "W" engaged in the chocks as shown in FIG. 6. FIG. 6 is a view from the outer side of the tire.

A wheel restraint assembly is positioned adjacent the outer side of each of the wheels. The wheel restraint assemblies 100 and 100A are shown in detail in FIGS. 2 and 3 and have been described above. Supports 104 are adjustably secured to the tilt bed frame, closely adjacent the outer edge of the location of the wheels "W" of the towed vehicle. The restraint assemblies are as otherwise described above each having an arm 110 which is normally spring biased to approximately the five o'clock position. The arm carries an end 106 which is outwardly spring biased but is prevented from disengagement with the outer tube by a suitable stop 108. The end carries a hold-down 115 having a tire-engaging inner surface. The end is connected to cable 120 which extends over a cable draw-down 118 at the lower end of the sweep arm. Once the vehicle is in position with the wheel surfaces engaged or seated against the opposed chocks 220, 222, the cable reel 130 may be operated to apply tension to the cables 120 which will cause the hold-down arms to rotate to the vertical position. Continued tension of the cable will cause the hold-downs 115 to retract to snugly engage the outer surface of the tire at a pre-set tension as for example approximately 650#. The cable reel operates off of the electrical system of the towing vehicle through a conventional electrical connector.

It is to be seen from the foregoing, that embodiment 200 of the present invention provides a fully automatic vehicle hold-down towing device having a wheel restraint, the operation of which relies upon a single actuator or cable reel. The wheel restraint assemblies of the device have only several moving parts and may be retrofit onto existing vehicle tow trailers or may be applied as an OEM component of new trailers. The hold-down arm is cable drawn from an unactuated position to an actuated position at which time rotary motion is terminated and further application of cable tension will bring a hold-down into engagement with the peripheral surface of the tire tread at a pre-set pressure which secures the vehicle wheel snugly in a three-point position preventing movement during transit. This device has particular application to use by individuals with motorhomes and other towing vehicles who transport auxiliary vehicles. Presently loading and unloading involves extensive positioning, placement of belting, harnesses, straps or chains and securing these devices in place which often occurs in either bad weather or in heavy traffic situations. As indicated, the device can be applied to presently manufactured tow trailers.

In another embodiment of the invention as described with reference to FIG. 1, the device comprises an adjustable dolly which carries the wheel restraint assemblies. The adjustable dolly is adapted for attachment to a commercial towing vehicle at a hitch. The dolly is adjustable to facilitate it being positioned beneath the towed vehicle having wheel chocks or retainer bars which are positionable in accordance with the wheel width and tire size of the towed vehicle. Wheel restraints as described above complete the assembly and are operable to bring a hold-down pad into engagement with a tire surface.

While the principles of the invention have been made clear in the illustrative embodiments set forth above, it will be obvious to those skilled in the art to make various modifications to the structure, arrangement, proportion, elements, materials and components used in the practice of the invention. For example, the adjustment of the wheel-engaging members and size of the dolly frame can be accomplished through manual means as for example the use of registry holes 250, 252 and in the frame 50, 80 and wheel-engaging members and locking pins 255, as seen in FIG. 7. To the extent that these various modifications do not depart from the spirit and scope of the appended claims, they are intended to be encompassed therein.

I claim:

1. A tow dolly for receiving and restraining a pair of vehicle wheels comprising:
   (a) a front frame member having opposite ends with first wheel-engaging members extendable and retractable at the opposite ends of said front frame member;
   (b) a rear frame member parallel to and spaced rearwardly from said front frame member having second wheel-engaging means extendable and retractable at the opposite ends of said rear frame member;
   (c) adjustable spacing members interconnecting said front and rear frame members;
   (d) wheel restraints carried on said first wheel-engaging members each having a hold-down member selectively moveable from a nonactuated position to an actuated position engaging and restraining the wheels whereby said tow dolly is positionable beneath the vehicle and adjacent the vehicle wheels with said second wheel-engaging members retracted and said first wheel-engaging members extended and thereafter said second wheel-engaging members are extended to engage a wheel surface and then said wheel restraint means are operated to bring said hold-down members to an actuated position.

2. The tow dolly of claim 1 further including a tow bar assembly.

3. The tow dolly of claim 2 wherein said tow bar assembly includes a tow block, a pair of arms secured to said front frame member and being pivotal with respect to said tow block about a horizontal axis, said tow block including hitch means.

4. The tow dolly of claim 3 wherein said hitch means is pivotal with respect to said tow block about a vertical axis and said hitch means is securable to a towing vehicle.

5. The tow dolly of claim 1 wherein wheel-engaging members are extendable and retractable by an actuator.

6. The tow dolly of claim 5 wherein said actuator includes a lead screw.

7. The tow dolly of claim 1 wherein first wheel-engaging members including a curved chock.

8. The tow dolly of claim 1 wherein said vehicle wheel restraints include a stand, first arm rotatable with respect to said stand about an axis approximately aligned with the axis of the wheel and moveable to a first nonactuated position and a second actuated position by actuating means, second arm extendable and retractable with respect to said first arm and having a wheel-engaging hold-down, said hold-down having a nonactuated position and an actuated position whereby said hold-down is actuated when said arms are moved to said second actuated position.

9. The tow dolly of claim 8 wherein said actuating means comprises a cable connected to said second arm and a tensioning means connected to selectively apply tension to said cable.

10. The tow dolly of claim 9 wherein said actuating means is electric and is connectable to the electrical system of a towing vehicle.

11. The tow dolly of claim 9 further including control means indicating the operational position of the wheel-engaging means and the wheel restraint means.

* * * * *